United States Patent
Begon et al.

(10) Patent No.: US 7,632,552 B2
(45) Date of Patent: Dec. 15, 2009

(54) METHOD FOR PRODUCING A POLARIZING OPTICAL ELEMENT

(75) Inventors: Cédric Begon, Charenton le Pont (FR); Christelle Defranco, Charenton le Pont (FR); Noémie Lesartre, Charenton le Pont (FR); Dominique Rychel, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 330 days.

(21) Appl. No.: 11/677,661

(22) Filed: Feb. 22, 2007

(65) Prior Publication Data

US 2007/0212518 A1    Sep. 13, 2007

(30) Foreign Application Priority Data

Feb. 23, 2006  (FR) .................................. 06 01612

(51) Int. Cl.
*C09K 19/00* (2006.01)
*B02B 38/04* (2006.01)
*G02F 1/13* (2006.01)

(52) U.S. Cl. ...................... 428/1.1; 428/1.2; 156/273.3; 349/193

(58) Field of Classification Search .................. 428/1.1, 428/12; 156/273.3; 349/193
See application file for complete search history.

(56) References Cited

U.S. PATENT DOCUMENTS

| 2,524,286 A | 10/1950 | Dreyer |
| 6,630,289 B1 | 10/2003 | Kwok et al. |
| 2005/0151926 A1 | 7/2005 | Kumar et al. |
| 2008/0044610 A1 * | 2/2008 | Lesartre et al. ............. 428/40.1 |

FOREIGN PATENT DOCUMENTS

| EP | 1426168 | 6/2004 |
| JP | 2004346093 | 12/2004 |
| JP | 2005049865 | 2/2005 |
| WO | 9964924 | 12/1999 |
| WO | 2006105999 | 10/2006 |

OTHER PUBLICATIONS

Search Report dated Oct. 26, 2006.

* cited by examiner

*Primary Examiner*—Geraldina Visconti
(74) *Attorney, Agent, or Firm*—Occhiuti Rohlicek & Tsao LLP (57) ABSTRACT

A multilayer polarizing structure is produced on a temporary support. The structure comprises at least one orienting layer and one polarizing layer comprising dichroic dyes, the dichroic dyes having an angular orientation determined by the orienting layer. The multilayer structure is separated from the temporary substrate before being applied onto a surface of an optical element. Applying the structure onto the optical element may be easily carried out while obtaining a quality compatible with many uses of the optical element, in particular ophthalmic uses.

38 Claims, 4 Drawing Sheets

METHOD FOR PRODUCING A POLARIZING OPTICAL ELEMENT

This application claims priority to French Application Serial No. 0601612, filed on Feb. 23, 2006, the contents of which are hereby incorporated by reference in its entirety.

FIELD OF THE INVENTION

The present invention relates to a method for producing a polarizing optical element, and also an optical element obtained by this process. It also concerns a multilayer structure that can be used to produce such a polarizing optical element.

BACKGROUND OF THE INVENTION

The advantages of polarizing optical elements, and most particularly polarizing ophthalmic lenses, are well known. In particular, such elements may remove interference reflections, which come from plane or quasi-plane horizontal surfaces, from the field of vision. This type of lenses, for example, is obtained conventionally in the ophthalmic industry using a polarizing film. The most conventionally used material for manufacturing polarizing films is PVA (polyvinyl alcohol). For ophthalmic applications, the PVA film can be used alone or sandwiched between two protective films, for example between two polycarbonate films, so as to form a less fragile composite film.

The polarizing ophthalmic lens is then obtained following two conventional routes used in the industry:

Via overmolding, by precisely positioning the polarizing film in a mold before casting a thermosetting monomer. After curing, the film is incorporated permanently into the volume of the ophthalmic lens substrate. PVA films alone are used for this.

Via injection molding, by positioning the polarizing film at the surface of an insert before injection-molding of a thermoplastic polymer. Such a technique is possible only if the side of the polarizing film in contact with the injection-molded polymer is a compatible thermoplastic material, that is to say capable of melting with the injection-molded material to give a durable assembly. It is applied in particular to composite films that are stacks based on a PVA film positioned between two protective films, and which may be thermoformed before being positioned in the insert. Furthermore, the protective film that covers the polarizing film on the side opposite to the optical element made from injection-molded material must not have significant birefringence as, in this case, the polarizing effectiveness of the optical element that is finally obtained may be reduced. This limits the variety of polarizing film that can be used in this type of method.

In the two methods, overmolding and injection molding, heating of the polarizing film causes a change in this film. In particular, its color and its polarizing effectiveness are modified involuntarily and in a not very reproducible manner. Furthermore, it is difficult to prevent uncontrolled displacements of the polarizing film from occurring during the overmolding.

Finally, the overmolding method does not allow an optical element to be obtained that has an optimized reduced total thickness. This is particularly irksome for high-refractive-index materials.

SUMMARY OF THE INVENTION

One aim of the present invention therefore consists in providing a method for producing a polarizing optical element that does not have the aforementioned drawbacks.

To this end, the invention provides a method for producing a polarizing optical element, according to which a multilayer structure is applied onto a surface of a base optical element. The structure comprises an orienting first layer, which itself comprises a photooriented polymer network. In addition it comprises a polarizing second layer, which in turn comprises liquid crystal polymers and at least one dichroic dye, these having an angular orientation that is determined by the first layer. The method comprises the following steps:

(a) producing the multilayer structure on a temporary support;

(b) removing the multilayer structure from the temporary support, so as to obtain the structure in the form of a self-supported membrane; and (c) applying the multilayer structure onto the pseudospherical surface of the base optical element.

Within the context of the invention, the term "surface of the base optical element" is understood to mean the whole surface of this element or at least one part of its surface. According to one feature of the invention, this surface of the base optical element is pseudospherical.

Within the context of the invention, the term "pseudospherical surface" is understood to mean a continuous concave or convex surface, that is to say a surface that is free from holes or steps. Such pseudospherical surfaces are especially encountered when the optical element is an optical lens. In general, at least one of the two faces of an optical lens is pseudospherical, so that the variation in the thickness of the lens which results therefrom gives it an optical power. A focal, unifocal, bifocal, trifocal and progressive ophthalmic lenses all have at least one pseudospherical side. A spherical surface corresponds to a particular case of a pseudospherical surface, for which the radii of curvature of the surface along two perpendicular directions are equal and uniform. In the following, the expression "pseudospherical surface" is understood to include the particular case of spherical surfaces.

Thus, the multilayer structure, which provides the polarizing function to the optical element, is first produced on a temporary support, then separated from this latter and applied to the base optical element. This sequence is made possible owing to the fact that the multilayer structure is sufficiently cohesive to be handled separately, that is to say without being borne by any support. The mechanical and physicochemical properties of the temporary support are therefore not involved during application of the multilayer structure onto the base optical element. This application may therefore be carried out simply, by considering only the mechanical behavior of the multilayer structure, without taking into account that of the temporary support.

A first advantage of a method according to the invention lies in the possibility of producing a polarizing optical element whose thickness is optimized. Indeed, the multilayer structure is simply applied onto a surface of the optical element, which does not significantly increase the thickness of this element.

A second advantage of a method according to the invention lies in the fact that the multilayer structure may be produced on the temporary support in the form of a continuous film. A large quantity of the multilayer structure may thus be manufactured economically, by passing the temporary support through successive manufacturing sections. The structure, once separated from its support, may then be cut into segments that are individually applied to different optical elements. Alternatively, the structure may be applied in its entirety, at one time, to several different elements, then the elements may be subsequently separated from one another.

A third advantage according to the invention it that the production of the polarizing film is completely separate from the production of the optical element. This is particularly advantageous for the ophthalmic lens sector.

A fourth advantage according to the invention is linked to the fact that applying the multilayer structure having the polarizing property onto the surface of an already-formed optical element allows the profile to the polarizing structure, thus with very good control of the distance separating the surface of the multilayer structure from the surface of the optical element. This is particularly beneficial for ensuring particular dioptric properties for the polarizing optical element finally obtained, especially in the case where the polarizing optical element is a progressive type ophthalmic lens, the radius of curvature of which varies continuously over its surface.

A fifth advantage of the method according to the invention stems from the fact that the temporary support may be recovered after the multilayer structure has been separated from it in step (b). Possibly, the recovered support may be reused to manufacture a new portion of multilayer structure.

According to another feature of the invention, the step (a) of the method comprises the following substeps:

(a1) forming, on the temporary support, a first layer of photoorientable polymers, which have photoreactive groups;

(a2) curing the first layer using a first linearly polarized ultraviolet radiation, so as to produce a polymer network that is photooriented along direction that is imposed by the polarization direction of this first ultraviolet radiation;

(a3) forming, on this first layer, a second layer which comprises a mixture of the dichroic dyes with at least one crosslinkable liquid crystal monomer, these being angularly oriented by the first layer, and (a4) at least partly curing the liquid crystal monomers of the second layer, so as to fix the dichroic dyes in the angular orientation determined by the first layer.

The linear polarization of the first ultraviolet radiation may be carried out using a polarizer that is inserted between a source of this first radiation and the first layer.

During the substep (a2), the reaction of the photoreactive groups that are borne by the photoorientable polymer, under the effect of the polarized radiation, result in the formation of an anisotropic polymer network that is oriented along the direction of the polarizer.

In the second layer of the polarizing system, the liquid crystal monomers and the dichroic dyes may adopt, during substep (a3), an orientation that is perpendicular to the direction of the polarizer, which has been imposed on the photoorientable polymer of the first layer. This orientation of the dichroic dyes provides the system with the properties of polarizing visible light. The cure of the liquid crystal monomers, in substep (a4), then permanently stabilized the configuration of the second layer.

According to yet another feature of the invention, the cure of the second layer in substep (a4) is carried out by using a dose of a second ultraviolet radiation that is adjusted so that the second layer has a glass transition temperature at or below room temperature. It is understood that the room temperature considered may vary, especially by plus or minus 5° C. In general, it is close to 25° C. In other words, the amount of ultraviolet radiation that is used in substep (a4) makes it possible to choose a degree of polymerization of the second layer, and consequently to adjust its thermomechanical properties. Thus, an undercure leads to a second layer that has a glass transition temperature (Tg) that is lower than that which would be obtained at the end of complete cure. The term "undercure" is understood to mean a partial cure, with a degree of polymerization such that some of the polymerizing functional groups of the second layer have not yet reacted. Such polymerizing functional groups may be, especially, acrylate or methacrylate functional groups. According to the invention, the dose of the second ultraviolet radiation must be sufficiently high so that the chemical gel point of the growing polymer is reached, while remaining sufficiently low so that the glass transition temperature of the final material of the second layer is suitable with respect to the operating temperature of the multilayer structure.

When the radiation dose of the second layer is such that the material that is obtained after the precure step has a glass transition temperature less than room temperature, this material has, at room temperature, mechanical properties that enable it to be easily handled and applied onto the base optical element.

Advantageously, the second layer has a thickness between 3 and 100 μm (micrometers), preferentially between 5 and 50 μm, and more particularly between 5 and 10 μm. In these conditions, the second layer may provide the whole multilayer structure with a sufficient mechanical cohesion so that the structure may be handled in the form of a self-supported membrane, especially for step (c).

Among the reactive photoorientable polymers that can be used within the scope of the invention, mention may be made, by way of indication, of those being formed from acrylic or methacrylic polymers, polyimides and dendrimers. Photoorientable reactive polymers having photoreactive groups such as cinnamic acid and its derivatives, chalcones, coumarins, or methacrylate bridges, may be particularly envisioned.

Among the dichroic dyes that can be used within the scope of the invention, mention may be made, by way of indication, of azomethines, indigoids, thioindigoids, indans, quinophthalonics, perylenes, phthaloperines, triphenodioxazines, indoloquinoxalines, imidazotriazines, azo and polyazo dyes, benzoquinones, naphthoquinones, anthraquinones and (poly) anthraquinones, anthrapyrimidinones, iodines and iodates. Advantageously azo dyes and anthraquinones are used within the context of the invention.

The multilayer structure may be applied in step (c) onto the surface of the base optical element with a portion of an adhesive placed between the structure and this element. Such a use of an adhesive enables a method according to the invention to be used for base optical elements that have different chemical compositions at the surface onto which the multilayer structure is applied. This adhesive, in the context of the invention may be applied onto one side of the optical element and/or onto the multilayer structure. Preferably, before step (c), the portion of adhesive is placed in the form of an additional layer of the multilayer structure on one side of said structure. With such a layer of adhesive, the multilayer structure contains all the components necessary to bring a polarizing function to any optical element. It is therefore sufficient to obtain the multilayer structure in order to produce a polarizing optical element from a simple optical element.

Among adhesives that can be used within the context of the invention, mention may be made, by way of indication and nonlimitingly, of: epoxy adhesives; reactive polyurethane adhesives; thermosetting adhesives; adhesives based on curable monomers such as cyanoacrylate adhesives; structural acrylic or modified acrylic adhesives; hot-melt adhesives; PVC (polyvinyl chloride) plastisols; elastomeric adhesives, neoprene contact adhesive; vinyl emulsion adhesives and copolymers; pressure-sensitive adhesives (PSAs) and water-based adhesives.

According to one embodiment of the invention, the use of a layer of pressure-sensitive adhesive or PSA, is particularly advantageous as it enables the multilayer structure to be bonded simply and inexpensively onto the surface of the base optical element, while retaining the dioptric properties of the optical element.

In addition, the possibility of depositing the PSA adhesive in the form of a thin layer with parallel faces, the thickness of which may be between 0.5 and 200 microns makes it possible, when the base optical element is an ophthalmic lens, not to impair its nominal power whatever the spatial region in question of the optical element. In this way, the bonding of the polarizing film is compatible with the precision that is necessary when the base optical element is a progressive ophthalmic lens.

The use of a pressure-sensitive adhesive does not require the use of irradiation, for example via ultraviolet radiation, nor intensive heating in order to obtain permanent bonding. Thus, the polarizing multilayer structure is not impaired or degraded by such irradiation or heating.

The invention also provides a multilayer structure that is suitable to be used in a method as described previously. Such a structure comprises:
- an orienting first layer, which comprises a photooriented polymer network; and
- an undercured polarizing second layer comprising at least one dichroic dye and a matrix of at least one crosslinkable liquid crystal monomer, adapted to fix an angular orientation of the dichroic dyes.

The dichroic dyes have an angular orientation that is determined by the first layer so as to produce a polarizing effect of the second layer for a light transmitted through the structure. This orientation is permanently fixed by incorporating the dichroic dyes within the matrix of crosslinkable liquid crystal monomers.

In addition, the first and second layers are adapted to form a self-supported membrane.

Such a multilayer structure may be placed onto a support so as to be able to be separated from the latter. It may be a support that is used while manufacturing the structure. Furthermore, it may be used to condition the structure between its manufacture and its subsequent use with an optical element.

The multilayer structure may comprise, in addition, a layer of adhesive. The portion of adhesive is placed in the form of an additional layer of the multilayer structure. It may further comprise at least one other functional layer, intended to bring an additional function to the optical element, at the same time as the polarizing function.

Finally, the invention provides a polarizing optical element that comprises a base optical element and a multilayer structure as described above. This multilayer structure is fixed to a pseudospherical surface of the base optical element by a layer of an adhesive placed between the base element and the multilayer structure. It provides the optical element with a polarizing function for a light transmitted through this element.

Other features and advantages of the present invention will become apparent in the description below of nonlimiting usage examples, with reference to the appended drawings.

BRIEF DESCRIPTION OF THE DRAWINGS

For the sake of clarity in the figures, the dimensions of the elements shown are not in proportion with actual dimensions or dimension ratios. In addition, identical references in different figures denote identical elements, or elements that have identical functions.

DETAILED DESCRIPTION

Figure 1A:
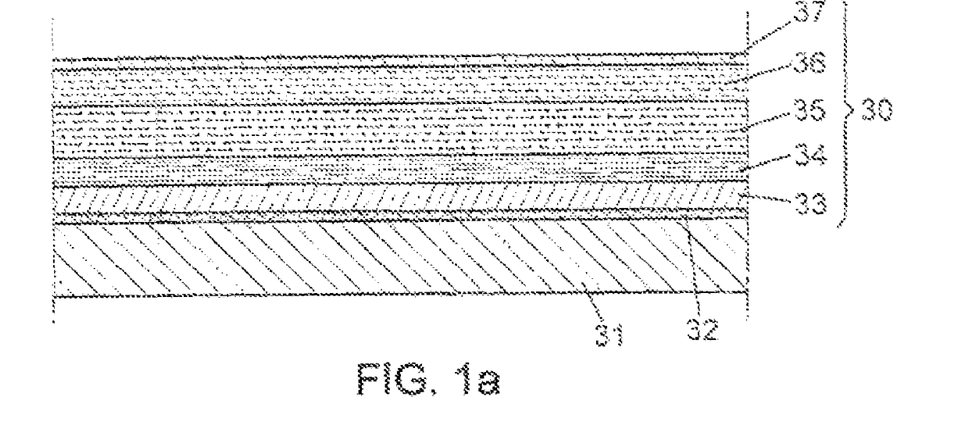
FIGS. 1a and 1b are cross sections of a multilayer structure borne by a support and separated from this, respectively, as used in an implementation of the present invention.

In accordance with FIG. 1a, a multilayer structure 30 is borne by a support 31. The support 31 is chosen from the materials having a surface energy that is between 25 mN/m (millinewtons per meter) and 40 mN/m. Among these materials, mention may be made by way of indication and non-limitingly, of branched or linear polyethylenes, poly(ethylene-co-acrylic acid)s of which the percentage is mols of acrylic acid is less than or equal to 2, polyethylene-co-polypropylenes, poly(ethylene-co-vinyl acetate)s, polyisobutenes, polyisoprenes, poly(4-methyl-1-pentene)s, polypropylenes, poly(2-methylstyrene)s, polystyrenes, poly(styrene-co-acylonitrile)s, poly(styrene-co-2,2,3,3-tetrafluoropropyl methacrylate)s, polychlorotrifluoroethylenes, poly(chlorotrifluoroethylene-co-tetrafluoroethylene)s, poly(tetrafluoroethylene-co-ethylene)s, polytrifluoroethylenes, polyvinyl chlorides, polyvinyl fluorides, polyvinylidene fluorides, polyvinyl acetates, polyvinyl (alkyl)oates, polyvinyl alcohols, polyvinyl butyrals, polyvinyl ethyl ethers, polyvinyl methyl ethers, polyvinyl formals, poly(n-butyl acrylate)s, polyethyl acrylates, poly(2-ethylhexyl acrylate)s, polybenzyl methacrylates, polyalkyl methacrylates, polyphenyl methacrylates, polyamides, polyurethanes and cellulosics.

Advantageously, the support 31 is made from polyethylene or polypropylene, which materials have respective surface energies of around 25 mN/m and 30 mN/m.

Preferably, the material of the support 31 has quite a low surface energy, so that the multilayer structure 30 can be easily separated from the support 31, for example by peeling. Possibly, an intermediate layer 32 is produced between the support 31 and the structure 30, in order to facilitate separation between the structure 30 and the support 31. Such an intermediate layer 32 is called a peeling layer and may comprise, in particular, a silicone-based surfactant.

Figure 1B:
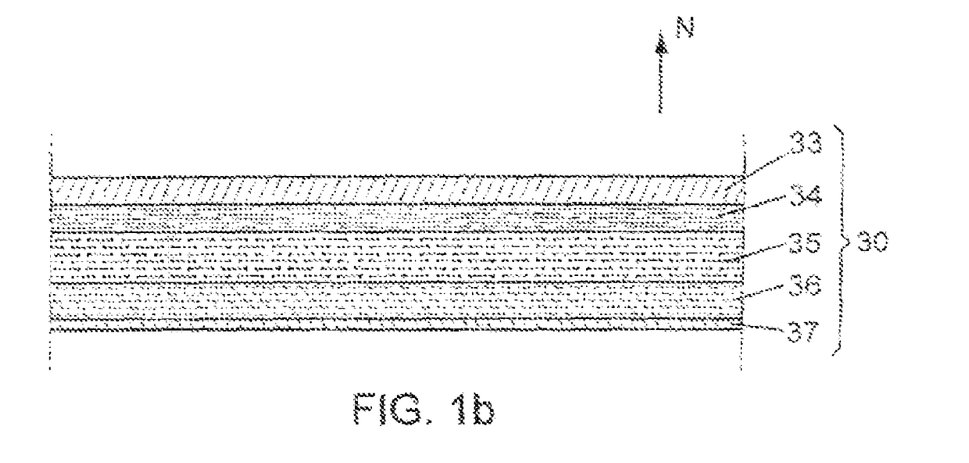

FIG. 1b represents the multilayer structure 30, after it has been separated from the support 31. For this reason, the support 31 is called a temporary support. It is used to produce the multilayer structure 30, then it is removed before the structure 30 is applied onto an optical element.

In the embodiment of the invention that is described here, the multilayer structure 30 comprises five individual layers, referenced 33 to 37.

The layer 33, which is formed first on the support 31 or on top of the peel layer 32, is intended to provide a specific function to the optical element onto which the structure 30 will be transferred. This may be, for example, a UV radiation protective layer, an oxygen barrier layer, an abrasion-resistant layer, an impact-resistant layer, an antireflecting coating, an antistatic coating or an antisoiling coating. Possibly, the layer 33 may be a combination of several of the preceding layers or coatings. The layer 33 then makes up part of the structure 30 that is intended to be separated from the support 31, in order to form a self-supported membrane according to the invention. The layer 33 may especially make it possible to reinforce the mechanical properties of the multilayer structure (34, 35) and thus to facilitate its handling as a self-supported membrane.

The layer 34, which is situated on the layer 33 within the structure 30, is formed from an anisotropic polymer network that induces an orientation of the compounds of the layer 35. The dichroic dyes that are incorporated into the layer 35 thus have an orientation that is determined by the layer 34. It results in a macroscopic polarizing effect of the structure 30, for a light beam that passes through it. In a known manner, the polarizing effect of the structure 30 is even greater when the distribution of the angular orientations of the dichroic dyes in the layer 35 is tight around the direction determined by the layer 34.

The layer 34 comprises photoorientable polymers having photoreactive groups, which, after reacting under linearly polarized light, from an anisotropic polymer network that is oriented along the direction of the polarizer. For example, the layer 34 is formed on the support 31, already provided with layers 32 and 33, from polymers bearing cinnamic acid photoreactive groups. This polymer is dissolved, for example, in a methyl ethyl ketone or cyclohexanone solvent or in a mixture of these latter two solvents. The surface energy of the material, on which the layer 34 is formed, is adjusted so as to obtain a continuous layer 34 of regular thickness. The solvent is then evaporated, for example using infrared radiation or by passing into an oven, and the layer 34 is cured under the effect of a UV-B type radiation. To cause cure of the layer 34 into the form of a photooriented polymer network, the UV-B radiation that is used is linearly polarized by a polarizer. This radiation may have an energy that is between 5 and 300 mJ/cm$^2$ (millijoules per centimeter squared), for example.

The layer 25 is then formed on the layer 34 from a mixture of crosslinkable liquid crystal monomers and dichroic dyes distributed in a solvent. Possibly, the dichroic dyes may be chosen to give a color to the structure and subsequently, to give the final optical element a solar filter function. The liquid crystal monomers and dichroic dyes of the layer 35 on the layer 34 may be mixed with a solvent such as cyclohexanone for example. The layer 35 is heated then cured under the effect of UV-A radiation. During the heating, the liquid crystal monomers adopt an orientation that is determined by the orientation of the photooriented polymer network of the layer 34 and that is perpendicular to this. The heating temperature may, for example, be 87° C. Naturally, the heating and drying step may be carried out within the same step of the overall method. The heating temperature will depend strongly on the type of liquid crystals used. During this step, the clarification temperature of the liquid crystals should not be exceeded. Above this temperature, the liquid crystals are no longer oriented along a preferential direction.

The thickness of the layer 34 may be between 50 and 200 nm (nanometers), and is preferentially equal to around 140 nm. The thickness of the layer 35 may be between 3 and 100 μm (micrometers), preferentially between 5 and 50 μm, and advantageously between 5 and 10 μm. Under these conditions, the mechanical behavior of the structure 30 is mainly provided by the layer 35. In order to obtain a mechanical behavior suitable for the implantation of the invention, the radiation energy for curing the layer 35 is preferably between 0.3 and 1.5 J (joules), even between 0.35 and 0.8 J. In particular, when the radiation energy is approximately equal to 0.4 J, the layer 35 that is obtained has a $T_g$ temperature below 25° C. The structure 30 has a mechanical cohesion that enables it to be handled separately from the support 31 without tearing it.

The layers 34 and 35 (and optionally 33) may be formed on the support 31 by spin-coating, roll coating or spray coating.

The structure 30 may also comprise a layer of an adhesive 36. This may be an epoxy-based layer, a latex-based layer, especially a polyurethane-based layer, or a layer made form a pressure-sensitive adhesive. It preferably has a constant thickness, in order not to subsequently modify the optical power of the optical element.

Optionally, the layer of adhesive 36 may be covered by a film or liner 37, intended to be removed so as to reveal the adhesive surface of the layer 36 before the structure 30 is applied onto the optical element.

The layer 36 may also be formed by spin-coating on the layers 33-35 borne by the support 31. Their information is considered to be known to a person skilled in the art and is not covered again here in detail.

Alternatively, it is possible to obtain the layer 36 initially combined with the liner 37, independently from the other layers of the structure 30. The layer 36 thus conditioned as applied onto the layer 35 by pressure through the liner 37. An identical configuration of the structure 30 may be obtained in this way.

Figure 2:
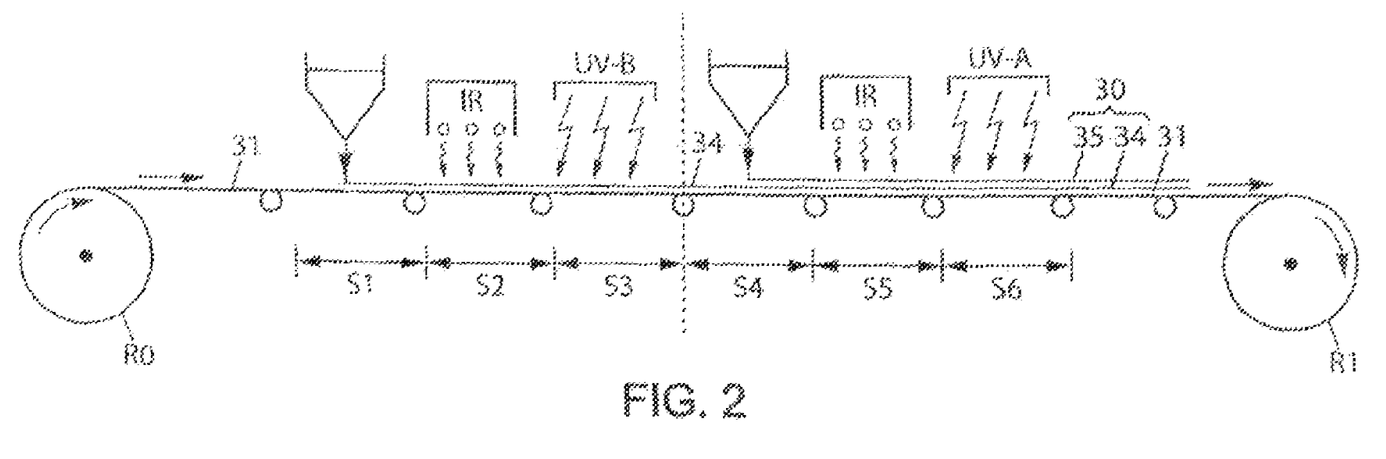
FIG. 2 illustrates the principle of a unit for producing a multilayer structure according to FIGS. 1a and 1b.

According to one preferred embodiment of the multilayer structure 30, this one is produced continuously on a support 31 in film form (sheet). In this case, a production installation as represented in FIG. 2 may be used. The support 31 is unwound from a feed roll R0, then wound again onto a conditioning roll R1. The installation comprises several sections placed between the rolls R0 and R1, to continuously form the layers 34 and 35 (optionally 33), especially. In particular, a first part of the installation may comprise sections S1-S3 to continuously deposit the precursor solution for the layer 34 onto the support 31 (section S1), for heating it (section S2), for example using a source of infrared radiation placed above the support 31, then for curing it by linearly polarized UV-B irradiation (section S3). Similarly, a second part of the installation may comprise sections S4-S6, respectively for depositing (section S4), heating (section S5) and curing (section S6) the layer 35. Such an installation makes it possible to rapidly and particularly economically produce a multilayer structure 30 borne by the support 31. The support 31 provided with the structure 30, in the form of a continuous film, may then be again unwound from the roll R1, and cut into segments intended to be applied onto different optical elements.

Such an installation for continuously producing the multilayer structure 30 may comprise additional sections not shown in FIG. 2, in order to carry out additional manufacturing steps. It may especially comprise one or more sections for forming the peel layer 32 and/or the functional layer 33. Such sections are placed between the feed roll R0 and section S1. The solvent used for depositing the peeling layer 32 may be n-propanol, when this layer comprises silicone compounds. The installation for producing the structure 30 may also comprise additional sections placed between section S6 and the conditioning roll R1, in order to form the layer of adhesive 36 and, possibly, the removable liner 37. The production installation may optionally comprise laminating sections before section S1 and/or after section S6.

By way of illustration, the invention will be described within the context of applying the above multilayer structure onto an ophthalmic lens that constitutes the base optical element. It is understood that it may be used in a similar way with other optical elements such as, especially, a sighting instrument element, a measurement instrument element or a helmet visor.

Figure 3:
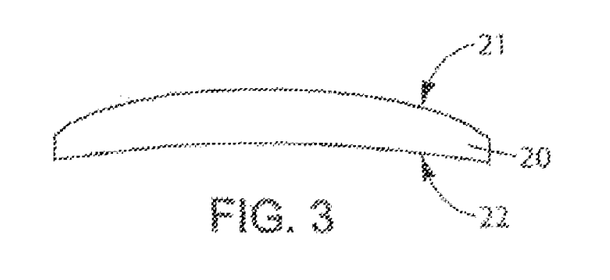
FIG. 3 is a cross section of a base optical element which may be used to implement the invention.

In accordance with FIG. 3, an ophthalmic lens 20 has a convex surface 21 and a concave surface 22. It may be made from a mineral or organic material, in particular from a high-refractive-index organic material. Within the context of the invention, the term "high-refractive-index" is understood to mean an index greater than or equal to 1.60, which may possibly be equal to 1.67, for example. The use of such a high-refractive-index material for producing a lens for correcting ametropia is particularly advantageous, since the lens may then have a reduced thickness and a lower curvature, for the same optical power. This results in a lower lens weight, which gives greater comfort to the wearer. In particular, such an ophthalmic lens may have a thickness of less than 1.2 mm in its central area, even approximately equal to 1.1 mm.

According to a first application method, the multilayer structure 30 is applied onto the front convex face 21 of the lens 20 as an example for illustrating this first application method, but the structure 30 may be applied in a similar way onto the back concave face 22 of the lens.

Figure 4A:
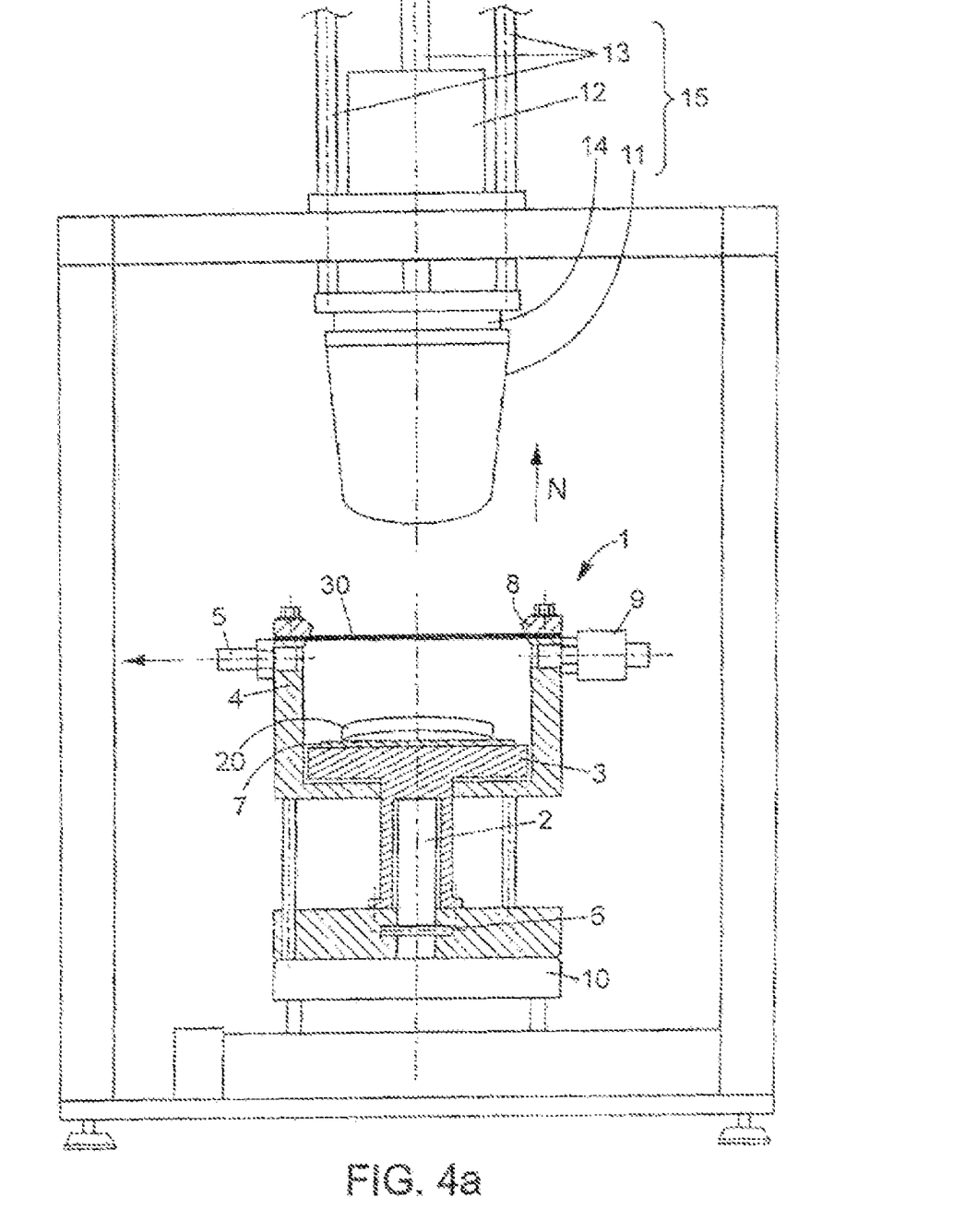
FIGS. 4a and 4b are respective cross sections of two devices used to implement the invention.
Figure 4B:
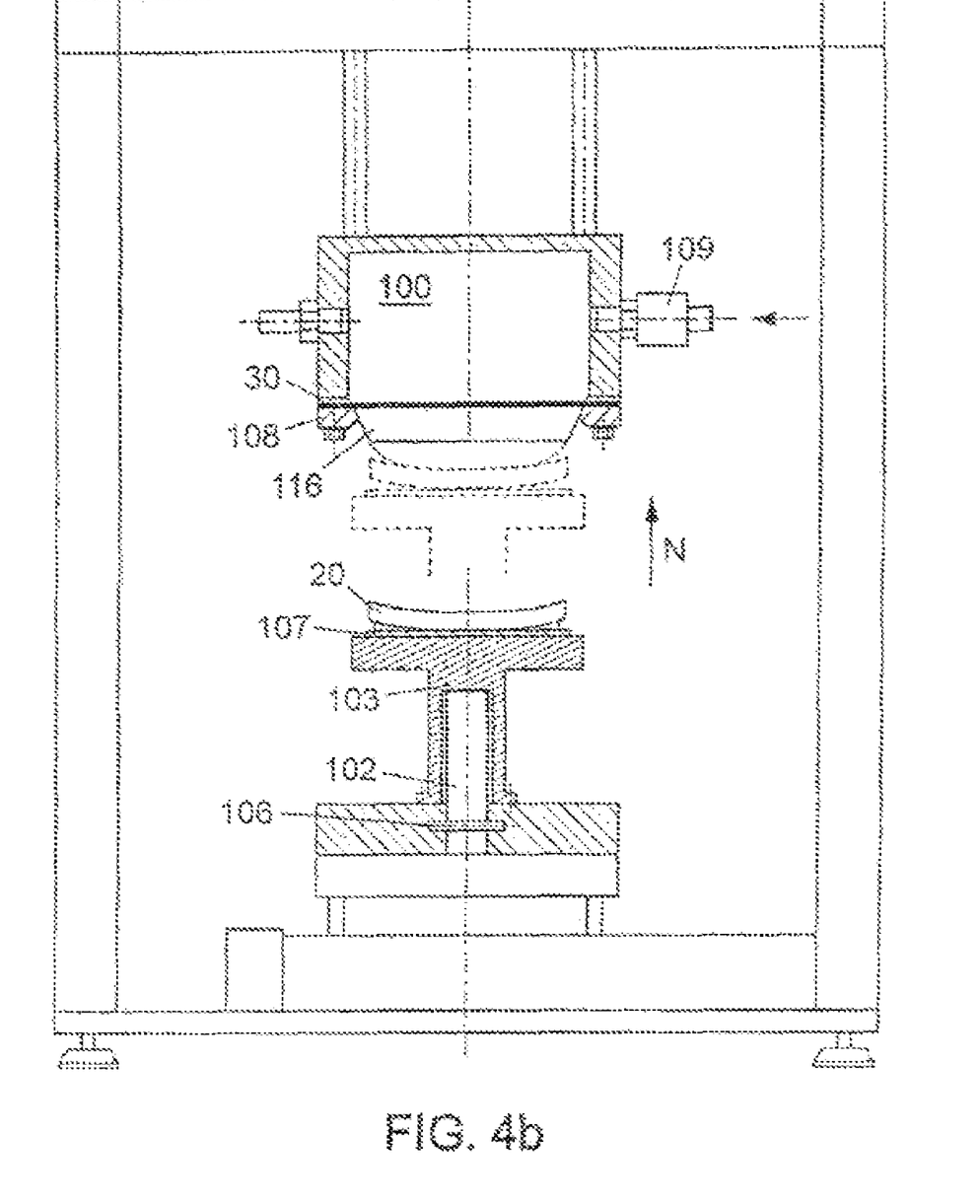

To do this, a device as described in the Patent Application FR/05 03306 and illustrated in FIG. 4a may be used. Such a device comprises a low pressure chamber 1 and an application system 15 placed above the chamber by means of a rigid structure.

The low-pressure chamber 1 itself comprises a side wall 4 which is for example cylindrical with a vertical axis. It is fitted with a clamping ring 8, in order to keep a membrane fixed against the upper peripheral edge of the wall 4. The chamber 1 is thus closed in a sealed manner on its upper face. The chamber 1 is placed above a base 10 at a fixed height. A cylinder 2 with a vertical axis and a piston 3, which passes through the lower face of the chamber 1, allow an element holder 7 to be moved vertically inside the chamber 1. A locking system 6 allow the height of the element holder 7 to be fixed, and the wall 4 is fitted with a gas inlet orifice 9, and also a vacuum orifice 5. The orifice 5 is connected to a pumping unit that is not shown.

The application system 15 comprises a pad 11 mounted on vertical runners 13 and can be moved using a displacement system 12. Such a displacement system may comprise a stepper motor that drives a translation screw, for example. A pressure detector 14, which may comprise a piezoelectric element, makes it possible to measure the force with which the pad is applied against the sealing membrane of the chamber 1.

The multilayer structure 30 is fixed onto the chamber 1 using the ring 8. It is oriented so that the layer of adhesive 36 is turned toward the inside of the chamber 1, in accordance with the vertical direction oriented N that is shown in FIGS. 1b and 4a. At this time, if the structure 30 comprises a liner 37 for covering the layer 36, this liner 37 is removed, for example by peeling, so as to reveal the adhesive of the layer 36.

The lens 20 is fixed onto the element holder 7, so that its face 21 is oriented toward the top.

Application of the multilayer structure 30 onto the lens 20 may then be carried out by bringing the structure 30 and the lens 20 together in several steps.

During a first step, the pad 11 is lowered so as to push a central part of the structure 30 toward the inside of the chamber 1. Given that the structure 30 is firmly held around its periphery by the ring 8, the structure 30 is deformed and takes up a curved shape, which corresponds to that of the lower end of the pad 11. When the structure 30 has plastic behavior, this first step consists of performing the multilayer structure, so that it may then be applied uniformly over the curved surface 21 of the lens 20.

During a second step, the lens 20 is brought closer to the multilayer structure 30 by creating a vacuum between them, inside the chamber 1. The piston 3 gradually rises as a gas initially present in the chamber 1 is sucked out via the orifice 5. When a point contact is achieved between the multilayer structure 30 and the surface 21 of the lens 20, the height of the piston 3 is then fixed using a locking system 6.

Finally, during a third step, the pad 11 is again lowered by pressing it onto the multilayer structure 30, on the side of the structure opposite to the lens 20. In this way, the structure 30 is applied over the whole of the surface 21 of the lens 20, with the layer of adhesive 36 sandwiched between them. The end of the pad 11 is preferably made from a flexible material, so as to obtain a uniform application of the structure 30 over the whole of the surface 21 of the lens.

The pad 11 is then raised, the vacuum within the chamber 1 is stopped and the ring 8 is released. The lens 20 is removed from the device with the structure 30, bonded via the adhesive layer 36 onto its convex face, perfectly matching the geometry of the base optical element. Optionally, an additional irradiation of the layer 35 may be carried out, with a UV-A radiation energy between 0.5 and 5.0 J. in order to complete the cure of the whole system. Such a cure of the whole system makes it possible to benefit from a suitable mechanical behavior of the structure 30 during its application onto the ophthalmic lens. Such a final irradiation may also make it possible to reinforce the stability of the system due to an increase in the degree of conversion of the constituent elements.

A polarizing ophthalmic lens that has a high polarization effectiveness is then obtained, which has a satisfactory optical quality. In particular, the inventors have found that the application of the structure 30 onto the lens 20 does not disturb the orientation of the dichroic dyes within the layer 35.

In addition, the use of a vacuum within the chamber 1 during the application of the structure 30 onto the lens 20 helps to avoid any gas bubbles being unintentionally trapped between the multilayer structure and the lens.

When the multilayer structure 30 comprises a functional layer 33 situated, within the structure, on the side opposite to the layer of adhesive 36, the layer 33 is situated at the surface of the polarizing lens obtained, on the side opposite to the lens 20 relative to the layers 34 and 35. Such a configuration is suitable when the layer 33 has a UV radiation protective function, a mechanical protection function, an antireflecting function or an antisoiling function.

It is understood that many modifications may be introduced into the usage examples of the invention which have been described in detail above, while keeping some at least of the advantages of the invention. Such modifications may make it possible, especially, to adapt these examples to particular uses of the optical element, or to optical elements other than an ophthalmic lens. In particular, the portion of adhesive that ensures the adhesion of the multilayer structure onto the base optical element may be initially placed onto this element, on the face of the latter which is intended to receive the multilayer structure.

The invention claimed is:

1. Method for producing a polarizing optical element by applying a multilayer structure onto a pseudospherical surface of a base optical element, the structure comprising an orienting first layer and a polarizing second layer itself comprising liquid crystal polymers and at least one dichroic dye, said dichroic dye having an angular orientation determined by the first layer, the method comprising the following steps:
   (a) producing the multilayer structure on a temporary support, said step (a) comprising the following substeps:
      (a1) forming, on said temporary support, a first layer based on photoorientable polymers having photoreactive groups;

(a2) curing said first layer using a first linearly polarized ultraviolet radiation, so as to produce a polymer network that is photooriented along a direction imposed by the polarization direction of said first ultraviolet radiation;

(a3) forming, on said first layer, a second layer comprising a mixture of the dichroic dyes with at least one crosslinkable liquid crystal monomer, these being angularly oriented by the first layer; and (a4) at least partly curing the liquid crystal monomers of the second layer, so as to fix the dichroic dyes in the angular orientation determined by the first layer, while using a dose of a second ultraviolet radiation adjusted so that said second layer has a glass transition temperature less than or equal to room temperature;

(b) removing the multilayer structure from the temporary support, so as to obtain the structure in the form of a self-supported membrane; and (c) applying the multilayer structure onto the pseudo-spherical surface of the base optical element.

2. Method according to claim 1, in which the second layer has a thickness between 3 and 100 µm, preferentially between 5 and 50 µm, and most preferentially between 5 and 10 µm.

3. Method according to claim 1, in which an energy of the second ultraviolet radiation used in substep (a4) to cure said second layer is between 0.3 and 1.5 J, preferentially between 0.35 and 0.8 J.

4. Method according to claim 1, comprising an additional step for curing the second layer, carried out after step (c), so as to terminate the cure of the liquid crystal monomer.

5. Method according to claim 1, in which the multilayer structure is produced in step (a) in the form of a continuous film, then optionally cut into segments intended to be applied onto different base optical elements.

6. Method according to claim 1, in which the temporary support has a surface energy between 25 mN/m and 40 mN/m, preferentially between 30 mN/m and 35 mN/m.

7. Method according to claim 6, in which the temporary support is based on a material chosen from polyethylene and polypropylene.

8. Method according to claim 1, in which step (a) comprises, in addition, the production of a peeling layer on the temporary support, between the multilayer structure and said temporary support.

9. Method according to claim 8, in which the peeling layer comprises a silicone-ased surfactant.

10. Method according to claim 1, in which step (a) comprises, in addition, the production, on the temporary support, of at least a third layer chosen from a UV radiation protective layer, an oxygen barrier layer, an abrasion-resistant layer, an impact-resistant layer, an antireflecting coating, an antistatic coating and an antisoiling coating, said third layer being part of the structure in the form of a self-supported membrane obtained in step (b), and being located at the end of step (c) on one side of said first and second layers opposite to the optical element.

11. Method according to claim 1, in which, in step (c), the multilayer structure is applied onto the surface of the base optical element with a portion of an adhesive placed between said structure and said optical element.

12. Method according to claim 11, in which the portion of adhesive is placed before step (c) in the form of a layer on one side of the optical element and/or in the form of an additional layer of the multilayer structure.

13. Method according to claim 11, in which the portion of adhesive is placed before step (c) in the form of an additional layer of the multilayer structure, on one side of said first and second layers.

14. Method according to claim 13, in which the layer of adhesive is covered with a liner within the multilayer structure, said liner being removed before step (c).

15. Method according to claim 11, in which the adhesive is chosen from pressure-sensitive adhesives, and in which the portion of said adhesive is placed before step (c) in the form of a layer having a thickness between 0.5 and 200 µm.

16. Method according to claim 1, comprising, in addition, between steps (b) and (c), a step for preforming the multilayer structure carried out so that said structure has a curved membrane shape.

17. Method according to claim 16, in which the step (c) comprises the following substeps:

(c1) moving the base optical element closer to the multilayer structure so as to produce a point contact between said structure and the surface of said optical element; and (c2) pressing the multilayer structure against the base optical element, so a to apply said structure onto the whole of the surface of said optical element.

18. Method according to claim 17, in which substep (c1) is carried out by creating a vacuum between the base optical element and the multilayer structure.

19. Method according to claim 17, in which substep (c2) is carried out by pressing a pad onto the multilayer structure, on a side of said structure opposite to the base optical element.

20. Method according to claim 1, in which step (c) is carried out by exerting a variable fluid overpressure on the multilayer structure, on a side of said structure opposite to the base optical element.

21. Method according to claim 1, in which the base optical element comprises a sighting instrument element, a measurement instrument element, an ophthalmic lens or a helmet visor.

22. Method according to claim 21, in which the base optical element represents an ophthalmic lens.

23. Method according to claim 22, in which the base optical element represents an ophthalmic lens, with one substrate of said lens having a refractive index greater than 1.60.

24. Multilayer structure comprising:

an orientation first layer, which comprises a photooriented polymer network; and an undercured polarizing second layer comprising at least one dichroic dye and a matrix of at least one crosslinkable liquid crystal monomer, adapted to fix an angular orientation of the dichroic dyes;

in which the dichroic dyes have an angular orientation determined by said first layer so as to produce a polarizing effect of the second layer for a light transmitted through the structure, and in which said first and second layers are adapted to form a self-supported membrane.

25. Structure according to claim 24, in which the second layer has a thickness between 3 and 100 µm, preferentially between 5 and 50 µm, and most preferentially between 5 and 10 µm.

26. Structure according to claim 24, having a continuous film form which may optionally be cut into segments, each segment possibly being applied onto a different base optical element.

27. Structure according to claim 24, comprising, in addition, at least a third layer placed on a same side of said first and second layers, said third layer being chosen from a UV radiation protective layer, an oxygen barrier layer, an impact-resistant layer, an abrasion-resistant layer, an antireflecting coating, an antistatic coating and an antisoiling coating.

28. Structure according to claim 24, placed on a temporary support having a surface energy between 25 mN/m and 40 mN/m, preferentially between 30 mN/m and 35 mN/m, so as to be possibly separated from said support.

29. Structure according to claim 24, comprising, in addition, a layer of an adhesive, situated on a side of said first and second layers.

30. Structure according to claim 29, in which the adhesive is chosen from pressure-sensitive adhesives, and the layer of said adhesive has a thickness between 0.5 and 200 µm.

31. Structure according to claim 29, comprising, in addition, a removable liner placed on the layer of adhesive.

32. Polarizing optical element comprising a base optical element and a multilayer structure fixed to a pseudospherical surface of said base element by a layer of adhesive, said multilayer structure comprising:
an orienting first layer, and
a polarizing second layer comprising dichroic dyes, in which the dichroic dyes have an angular orientation determined by said first layer so as to produce a polarizing effect for a light transmitted through the optical element.

33. Element according to claim 32, in which the second layer has a thickness between 3 and 100 µm, preferentially between 5 and 50 µm, and most preferentially between 5 and 10 µm.

34. Element according to claim 32, in which the pseudospherical surface of the base optical element is convex or concave.

35. Element according to claim 32, in which the base optical element comprises a sighting instrument element, a measurement instrument element, an ophthalmic lens or a helmet visor.

36. Element according to claim 35, in which the base optical element represents an ophthalmic lens.

37. Element according to claim 36, in which the base optical element represents an ophthalmic lens having a refractive index greater than 1.60.

38. Element according to claim 32, in which the multilayer structure comprises, in addition, at least a third layer placed on the first and second layers of a side opposite from the base optical element, said third layer being chosen from a UV radiation protective layer, an oxygen barrier layer, an impact-resistant layer, an abrasion-resistant layer, an antireflecting coating, an antistatic coating and an antisoiling coating.

* * * * *